United States Patent [19]
Schlachter

[11] Patent Number: 6,065,794
[45] Date of Patent: May 23, 2000

[54] SECURITY ENCLOSURE FOR OPEN DECK VEHICLES

[76] Inventor: Bradley S. Schlachter, P.O. Box 12168, Dallas, Tex. 75225

[21] Appl. No.: 08/801,813

[22] Filed: Feb. 14, 1997

[51] Int. Cl.[7] ...................................................... B60R 5/04
[52] U.S. Cl. ........................................ 296/37.6; 296/37.16
[58] Field of Search ................................ 296/24.1, 37.5, 296/37.6, 37.16; 224/401, 404, 542

[56] References Cited

U.S. PATENT DOCUMENTS

| | | | |
|---|---|---|---|
| 3,640,423 | 2/1972 | Parker et al. | 220/324 |
| 4,127,301 | 11/1978 | Syrowik | 296/37.16 |
| 4,262,955 | 4/1981 | Duda | 296/24.1 |
| 4,413,854 | 11/1983 | Hirshberg | 296/146.8 |
| 4,451,075 | 5/1984 | Canfield | 296/37.6 |
| 4,480,675 | 11/1984 | Berkemeier | 160/121.1 |
| 4,506,870 | 3/1985 | Penn | 296/180.1 |
| 4,632,446 | 12/1986 | Douglass | 296/37.6 |
| 4,674,782 | 6/1987 | Helber | 293/106 |
| 4,733,898 | 3/1988 | Williams | 296/24.1 |
| 4,749,226 | 6/1988 | Heft | 296/37.6 |
| 4,752,096 | 6/1988 | Ishikawa | 296/37.16 |
| 4,776,625 | 10/1988 | Lobanoff et al. | 296/37.16 |
| 4,828,312 | 5/1989 | Kinkel et al. | 296/37.6 |
| 4,938,519 | 7/1990 | Schlachter | 296/37.6 |
| 5,324,089 | 6/1994 | Schlachter | 296/37.5 |
| 5,564,768 | 10/1996 | Saffold | 296/37.6 |

*Primary Examiner*—Dennis H. Pedder
*Attorney, Agent, or Firm*—Haynes and Boone LLP

[57] ABSTRACT

In a vehicle having a load deck, deck sidewalls including respective wheel wells, and a tailgate, a security enclosure for installation on the load deck thereof comprises a first panel mounted between the deck sidewalls and sloping upwardly toward the tailgate from a first end adjacent the load deck to a distal second end. A second panel coupled to the second end of the first panel and extending therefrom toward the tailgate defines an enclosed space with the first panel, the tailgate, the load deck, and the deck sidewalls. A releasable lock mechanism is attached to the second panel and includes a bolt extendable through a bore formed through the first panel to secure the second panel to the first panel. In addition, the second panel includes opposing sloped edges for engaging the wheel wells to support the second panel in a generally horizontal position.

25 Claims, 5 Drawing Sheets

SECURITY ENCLOSURE FOR OPEN DECK VEHICLES

BACKGROUND OF THE INVENTION

The present invention relates to an enclosure for storing items in a vehicle and, more particularly, to a security enclosure for securely storing items on a load deck of a vehicle.

The cargo-carrying area of an open deck vehicle such as a jeep or pickup truck is commonly referred to as the load deck. Cargo space for tools, luggage, portable radios, portable telephones, cassette tapes, tape decks, jewelry, and other valuables may not be fully utilized because of the risk of unauthorized use or theft of such portable property when it is left unsecured and unattended on the load deck.

To secure such personal property on the load deck of an open deck vehicle and, hence, to reduce the risk of unauthorized use or theft thereof so that cargo space may be more fully utilized, storage enclosures have been developed. Such storage enclosures are typically mounted onto or along the sidewalls of the open deck. Conventional storage enclosures are approximately the size and shape of a steamer trunk and are installed at a forward location on the load deck just behind the cab.

Many contractors and craftsmen, finding such security enclosures to be inadequate, have adapted camper shells and canopies for attachment to the load deck sidewalls for securing portable equipment and tools. Others have attempted to secure their valuables by a slidable tonneau cover which attaches onto the sidewalls of the load deck.

There are, however, many drawbacks to commercially available security enclosures. For example, conventional tool boxes, when mounted onto the load deck of a pickup or jeep, are conspicuous and accessible to unauthorized persons. The locking system for such security enclosures is easily snapped open with a pry bar. Such security enclosures may be easily removed if not bolted to the body of the pickup truck. The presence of a security enclosure such as a tool box which extends across the load deck interferes with the placement and mounting of portable covering enclosures such as a canopy, camper shell, and the like. Such security storage units usually include a lock which requires a separate key for opening, and cannot be opened by the vehicle ignition key or door key. Such add-on security enclosures cannot be easily integrated into an on-board vehicle security system which provides an alarm in response to tampering and/or forcible entry.

A security storage unit for mounting on the open deck of a pickup truck or jeep which overcomes the foregoing limitations is disclosed in U.S. Pat. No. 4,938,519 issued to Bradley S. Schlachter, the inventor of the present application, and entitled "Security Enclosure for Open Deck Vehicle" (the '519 Patent). The security enclosure disclosed therein is mounted on the open load deck of a jeep or other vehicle between the rear seat and the tailgate. The load deck, deck sidewalls, and tailgate provide four sidewalls of the security compartment. The top and forward walls of the security enclosure are provided by top and forward panels which are secured together along a common edge in an L-shaped configuration. The top and forward panels are stabilized by side flanges which are adapted for flush engagement against the load deck side panels.

Because the security enclosure disclosed in the '519 Patent lies below the deck sidewalls, it does not interfere with the attachment of a camper shell, canopy, or other covering. When the tailgate is closed, the security enclosure is concealed and the top panel appears to be part of the rear wheel well structure. Because the side flanges are securely fastened to the deck side panels, access to the security compartment can be gained only by first opening the tailgate. Accordingly, the security compartment is secured and locked when the tailgate is closed and locked. Personal property can be safely stored within the security compartment when it is necessary to leave the vehicle unattended. Additionally, if the vehicle is equipped with an electronic security alarm which monitors the tailgate lock, the security compartment will be further protected by the on-board vehicle security system since the security enclosure does not interfere with operation of the tailgate door or the lock assembly.

Because the security compartment paneling is fastened internally by threaded fasteners, or in some installations by welding, the security enclosure becomes a permanent fixture upon installation. Consequently, the security enclosure imposes a limitation on the use of the load deck of the vehicle for cargo handling. That is, the load deck volume enclosed within the compartment can only be used for securing items which are small enough to fit within the enclosed space. Therefore, large items, such as hunting rifles, fishing rods, oversized packages, rolled construction blueprints, beverage coolers, camping tents, and the like could not be secured-within the security enclosure space.

It can be appreciated that, but for the permanent installation in a vehicle of a security enclosure of the type disclosed in the '519 Patent, such oversized items could be transported on the rear deck of the vehicle, by standing such items on end, lashing them to the deck sidewall or roll bars, or laying such items transversely across the rear deck, with one end portion resting on a sidewall. In such arrangements, the ability to accommodate large, oversized articles is given up for secure, unattended storage of smaller items.

The foregoing drawbacks of the '519 Patent are overcome by a security storage unit disclosed in U.S. Pat. No. 5,324,089, also to Bradley S. Schlachter, and entitled "Convertible Security Enclosure for Open Deck Vehicle" (the '089 Patent). The security enclosure disclosed therein includes a top and forward panel somewhat similar to the top and forward panel disclosed in the '519 Patent. Unlike the enclosure of the '519 Patent, however, the top and forward panels of the '089 Patent are hingedly coupled so that the top panel may be rotated between a closed position and an open position. In the closed position, the security enclosure provides that same features as in the enclosure of the '519 Patent. In the open position, however, large oversized articles may be accommodated as they would if there were no enclosure installed in the vehicle. For example, large items could be stood on end, lashed to the deck sidewall or roll bars, or laid up transversely across the rear deck, with one end portion resting on a sidewall.

Although the security enclosure of the '089 Patent accommodates large, oversized items, it presents an obstacle when it is desired to utilize the entire load deck for storage. For example, in many vehicles, the rear seat may be removed to maximize the cargo space available for transporting very large items such as large boxes or large pieces of lumber. It is also desirable, in many cases, to be able to slide such large items through the tailgate and across the load deck of the vehicle when loading and unloading the items. However, the enclosure disclosed by the '089 Patent is an impediment to such loading/unloading and/or storage of very large items.

The security enclosure of the '089 Patent also prevents the space between the rear seat and the forward panel of the enclosure from being utilized. Furthermore, the '089 Patent calls for separate retainer flanges which must be attached to the rear wheel wells of the vehicle to support and secure the top panel. Such retainer flanges not only require additional labor to install, but they are not amenable to a single configuration which is adaptable to any shape of wheel well.

Therefore, what is needed is a security enclosure which is not an impediment to loading and storing very large items onto the load deck and which does not waste space or require special retainer flanges to be utilized.

SUMMARY OF THE INVENTION

The present invention, accordingly, provides a security enclosure which is not an impediment to loading and storing very large items onto the load deck and which does not waste space or require special retainer flanges. To this end, a security enclosure is disclosed for installation on the load deck of a vehicle having a rear seat, deck sidewalls with respective wheel wells, and a tailgate, in addition to the load deck. The security enclosure comprises a forward panel mounted between the deck sidewalls and sloping upwardly toward the tailgate from a first end adjacent the load deck to a distal second end. A top panel coupled to the second end of the forward panel and extending therefrom toward the tailgate defines an enclosed space with the forward panel, the tailgate, the load deck, and the deck sidewalls. A releasable lock mechanism is attached to the top panel and includes a bolt extendable through a bore formed through the forward panel to secure the top panel to the forward panel. In addition, the top panel includes opposing sloped edges for engaging the wheel wells to support the top panel in a generally horizontal position.

An advantage achieved with the present invention is that it utilizes available space as efficiently as possible.

Another advantage achieved with the present invention is that it does not require separate retainer flanges to secure the top panel in a closed position.

In one embodiment of the present invention, channels are connectable to the deck sidewalls for receiving the forward panel. A pin extends inwardly from the tailgate, and the top panel defines a bore for receiving the pin, the receipt of which prevents the removal of the security enclosure from the channels and substantially secures the top panel to form the enclosure. An advantage achieved with this embodiment is that, while providing security for relatively small personal property items, it can be readily removed to provide for full access to all cargo space available in the vehicle for storing very large items.

In yet another embodiment of the present invention, a locking bar is positioned on the tailgate so that, when the tailgate is closed, the locking bar lies generally flush with the top panel and thereby substantially secures the top panel to form the enclosure. An advantage achieved with this embodiment over the foregoing pin arrangement is that its structural integrity is enhanced, it is simpler to position, and is less likely to cause damage or be damaged by other objects or garments.

DESCRIPTION OF THE PREFERRED EMBODIMENTS

Figure 1:
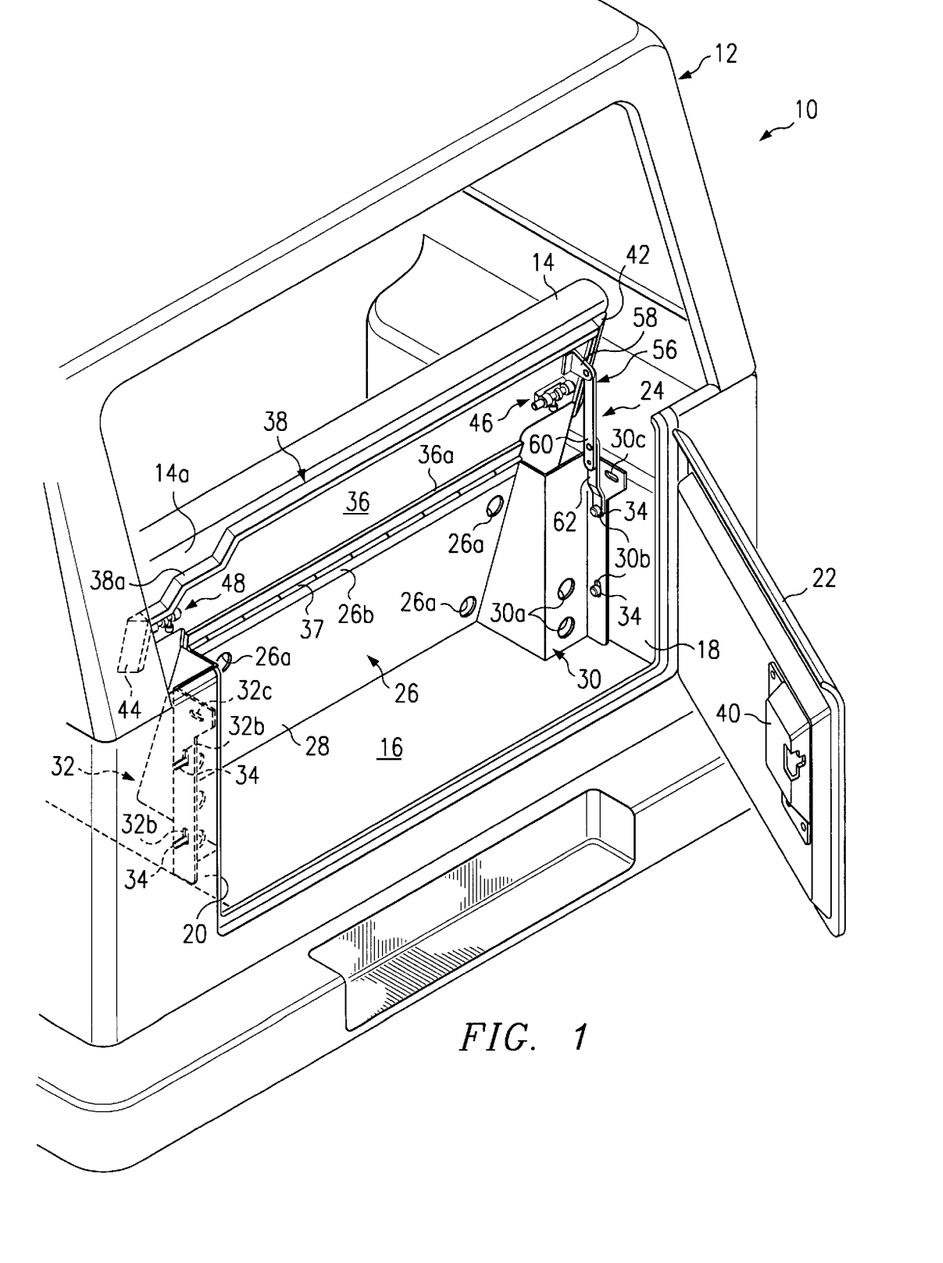
FIG. 1 is a perspective view of the security enclosure, according to a first embodiment of the present invention, mounted in an open configuration on the load deck of a jeep vehicle.

Referring to FIG. 1 of the drawings, the reference numeral 10 refers, in general, to the rear portion of a vehicle 12 having a rear seat 14, a load deck 16 extending immediately behind the rear seat, opposing deck sidewalls 18 and 20 extending upwardly from the load deck, and a tailgate 22 hingedly attached to the vehicle. It is understood that, unless specified otherwise, directional terms used herein are used in their normal sense with respect to the vehicle 12. For example, the tailgate 22 is positioned to the "rear" of the rear seat 14, and the rear seat 14 is positioned "forward" of the tailgate 22.

In accordance with a first embodiment of the present invention, a security enclosure, identified in general by the reference numeral 24, is disposed in the rear portion 10 of the vehicle 12.

Figure 2:
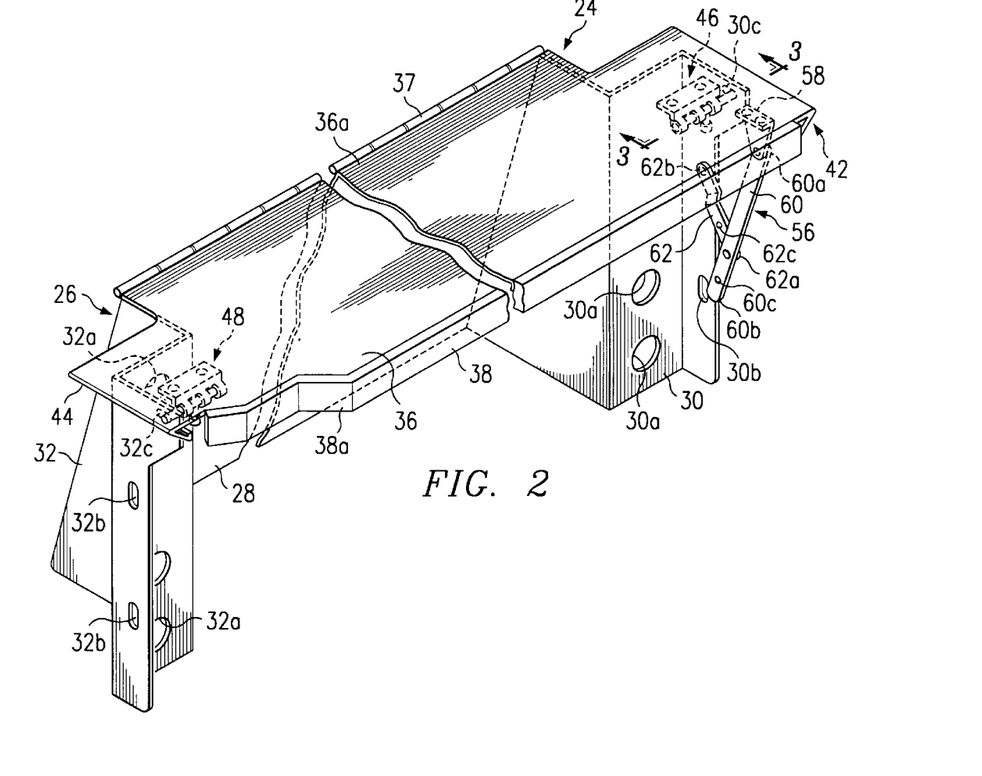
FIG. 2 is a perspective view of the security enclosure of FIG. 1 shown in a closed configuration.

Referring to FIG. 1 and, with respect to the security enclosure 24, FIG. 2, the security enclosure includes a forward enclosure panel 26 having a forward portion 28 which extends nonperpendicularly from the load deck 16 to conform to the angle of a rear side 14a of the rear seat 14 and to be generally flush therewith. Two flanged portions 30 and 32 extend transversely from opposing ends of the forward portion 28 rearwardly around seat belt straps (not shown) until they are flush with the deck walls 18 and 20, respectively. The forward enclosure panel 26 and the two flanged portions 30 and 32 define openings 26a, 30a, and 32a, respectively, for air circulation and the connection of cargo netting (not shown) to the rear side 14a of the rear seat 14.

The flange portions 30 and 32 define bores 30b and 32b, respectively, which correspond with threaded bores (not shown) formed in the deck sidewalls 18 and 20, respectively. A plurality of sheet metal screw fasteners 34 extend through the bores 30b and 32b and threadingly engage the corresponding bores in the deck walls 18 and 20, to thereby rigidly secure the forward panel 26 to the deck walls 18 and 20 and onto the load deck 16.

A top enclosure panel 36 is rotatably attached to the forward panel 26 via a conventional hinge 37, such as a piano hinge, connected between a top edge 26b of the forward panel 26 and a forward edge 36a of the top panel 36. The hinge 37 is attached to the edges 26b and 36a using any of a number of well known techniques. For example, the hinge 37 may be welded or screwed to the edges 26b and 36a. The panels 26 and 36 are, preferably, constructed from heavy gauge sheet metal such as, for example, No. 16 gauge galvanized steel.

The top panel 36 includes a rear edge reinforcing lip 38 configured so that, when the top panel is placed in a closed position, as depicted in FIG. 2, the lip abuts with the tailgate 22 (when the tailgate is also in the closed position, not shown). It can be appreciated that a portion 38a of the lip 38 is recessed to abut, without interference, a tailgate latch housing 40 which projects inwardly from the tailgate 22 toward the rear portion 10 of the vehicle 12 when the tailgate 22 is in a closed position (not shown).

Figure 3:
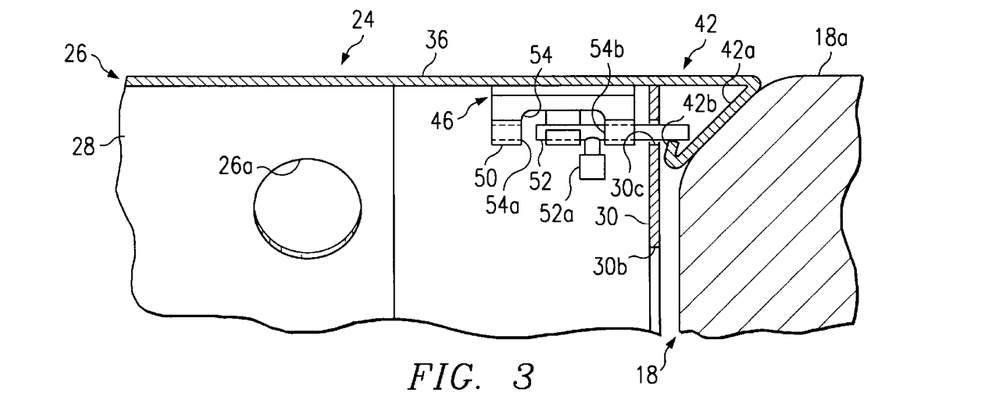
FIG. 3 is elevational sectional view of the security enclosure taken along the line 3—3 of FIG. 2.

The top panel 36 further includes opposing end portions 42 and 44. As more clearly depicted in FIG. 3, with the top panel 36 in the closed position, the sheet metal forming the end portion 42 is folded clockwise approximately 135° to form a support portion 42a which rests on a wheel well portion 18a extending upwardly and outwardly from the sidewall 18. It can be appreciated that when the top panel 36 is disposed in the closed position, the panel lies in flush alignment with the top of the wheel well 18a. As also depicted in FIG. 3, a tip portion 42b extending from the support portion 42a is folded an additional 135° clockwise for purposes described below. It is understood that the end 44 opposite the end 42 is formed similarly to the end 42.

Referring to FIG. 1, two conventional releasable lock mechanisms 46 and 48 are attached, e.g., screwed or welded, to the underside of the top panel 36. As more clearly shown in FIG. 3, the lock mechanism 46 includes a housing 50 and a bolt 52 slidably disposed therein. The bolt 52 includes a knob 52a which extends radially therefrom through a U-shaped slot 54 formed in the lock mechanism housing 50. The slot 54 includes two downwardly open end portions 54a and 54b, and it can be appreciated that the bolt 52 is longitudinally slidable within the housing 50, except when the knob 52a is positioned to extend through one of the end portions 54a or 54b. It is understood that the lock mechanism 48 is similar to the lock mechanism 46.

With further reference to FIG. 3, the flange portion 30 further defines a bore 30c (see also FIG. 1) which is aligned for receiving the bolt 52 when the top panel 36 is in the closed position and the bolt is extended outwardly from the housing 50. As the bolt 52 is extended beyond the bore 30c, it also engages the tip 42b. It can be appreciated that the foregoing extension of the bolt 52 secures the top panel 36 in the closed position shown in FIGS. 2 and 3. It can be further appreciated that, as shown in FIGS. 1 and 2, the flange portion 32 defines a bore 32c aligned for receiving a bolt extended from the lock mechanism 48 in a manner similar to that described with respect to the foregoing bore 30c.

Referring to FIGS. 1 and 2, a linkage 56 is provided for limiting the extension of the top panel 36 from the forward panel 26. The linkage 56 comprises a connector 58 rigidly connected, e.g., screwed or welded, to the underside of the top panel 36. A first locking arm 60 having first and second ends 60a and 60b is pivotally coupled at its end 60a to the connector 58. A detent 60c is formed near the end 60b for reasons to be described. A second locking arm 62 having first and second ends 62a and 62b is pivotally coupled at its end 62a to an intermediate point between the first and second ends 60a and 60b of the first locking arm 60. The end 62b of the arm 62 is pivotally coupled to the flange portion 30. The second locking arm 62 has a recess 62c formed therein for receiving the detent 60c when the top panel 36 is rotated to an upright position, as shown in FIG. 1, and substantially locking the top panel in the upright position.

In operation, the top panel 36 may be placed in an open position, as shown in FIG. 1, or in a closed position, as shown in FIG. 2. With the top panel 36 in the closed position, the bolts 52 in the lock mechanisms 46 and 48 may be inserted through the bores 30c and 32c, respectively, and engage the respective tips of the ends 42 (i.e., the tip 42b) and 44, respectively, thereby locking the top panel 36 in the closed position. It can be appreciated that, with the top panel 36 locked in the closed position, and with the tailgate 22 closed, a compartment is defined by the forward panel 26 and top panel 36 of the security enclosure 24, the tailgate 22, the load deck 16, and the deck sidewalls 18 and 20. Valuables may be secured in the compartment defined therein by locking the top panel 36, as described above, as well as the tailgate 22. It can be appreciated, too, that because the top panel 36 in the closed position lies in flush alignment with the wheel well 18a and a wheel well extending from the side wall 20, additional items may be stored on top of the top panel 36.

Access to valuables secured by the enclosure 24 may only be gained by opening the tailgate 22 as the lock mechanisms 46 and 48 are disposed within the enclosure. After the tailgate is opened, the bolts 52 of the lock mechanisms 46 and 48 may be retracted from the respective bores 30c and 32c to unlock the top panel 36 from its secured position. The top panel 36 may then be rotated about the hinge 37 to an upright position, as shown in FIG. 1, until the top panel abuts the rear side 14a of the rear seat 14 and the detent 60c is received in the recess 62c, thereby "locking" the top panel in the upright position. The top panel 36 may be "unlocked" from the upright position by applying a small amount of force in a rearward direction against arms 60 and 62.

The foregoing first embodiment of the present invention has several advantages. For example, because the forward portion 28 of the forward panel 26 is oriented non-perpendicularly to the load deck 16 to conform with the rear side 14a of the rear seat 14, a greater amount of space is made available for storing valuables in the security enclosure than would be possible under the prior art which taught a vertically disposed forward portion. Furthermore, because the bolts 52 engage the bores 30c and 32c of the respective flanges portions 30 and 32, there is no need as there is in the prior art for attaching a separate retainer flange to the wheel well 18a and to the corresponding wheel well extending from the sidewall 20 to secure the top panel 36 in the closed position. Moreover, the shape of the end portions 42 and 44 of the top panel 36 enable the top panel to be supported by the wheel wells 18a, thereby further eliminating the need for separate retainer flanges.

Figure 4:
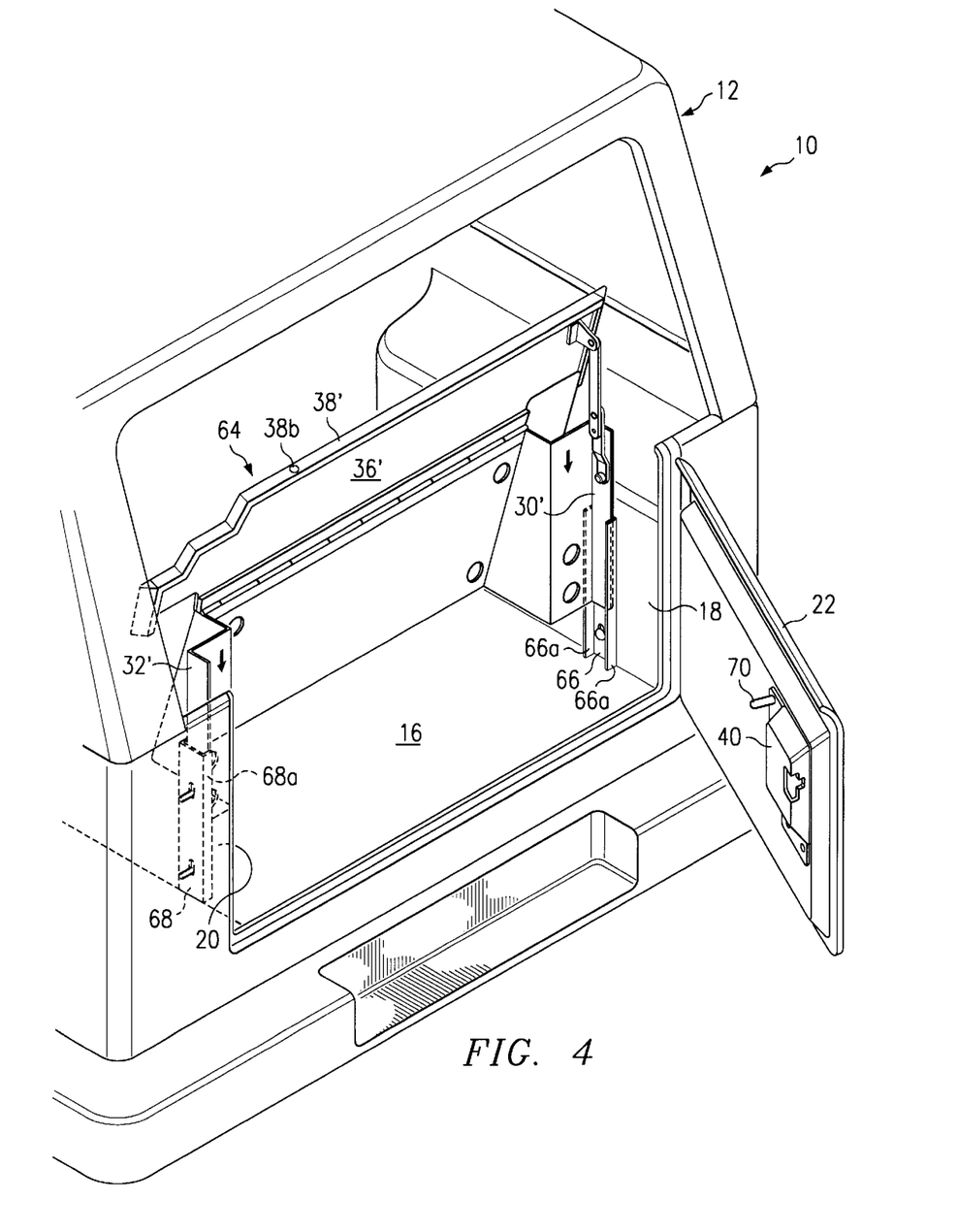
FIG. 4 is a perspective view of the security enclosure, according to a second embodiment of the present invention, mounted in an open configuration on the load deck of a jeep vehicle.
Figure 5:
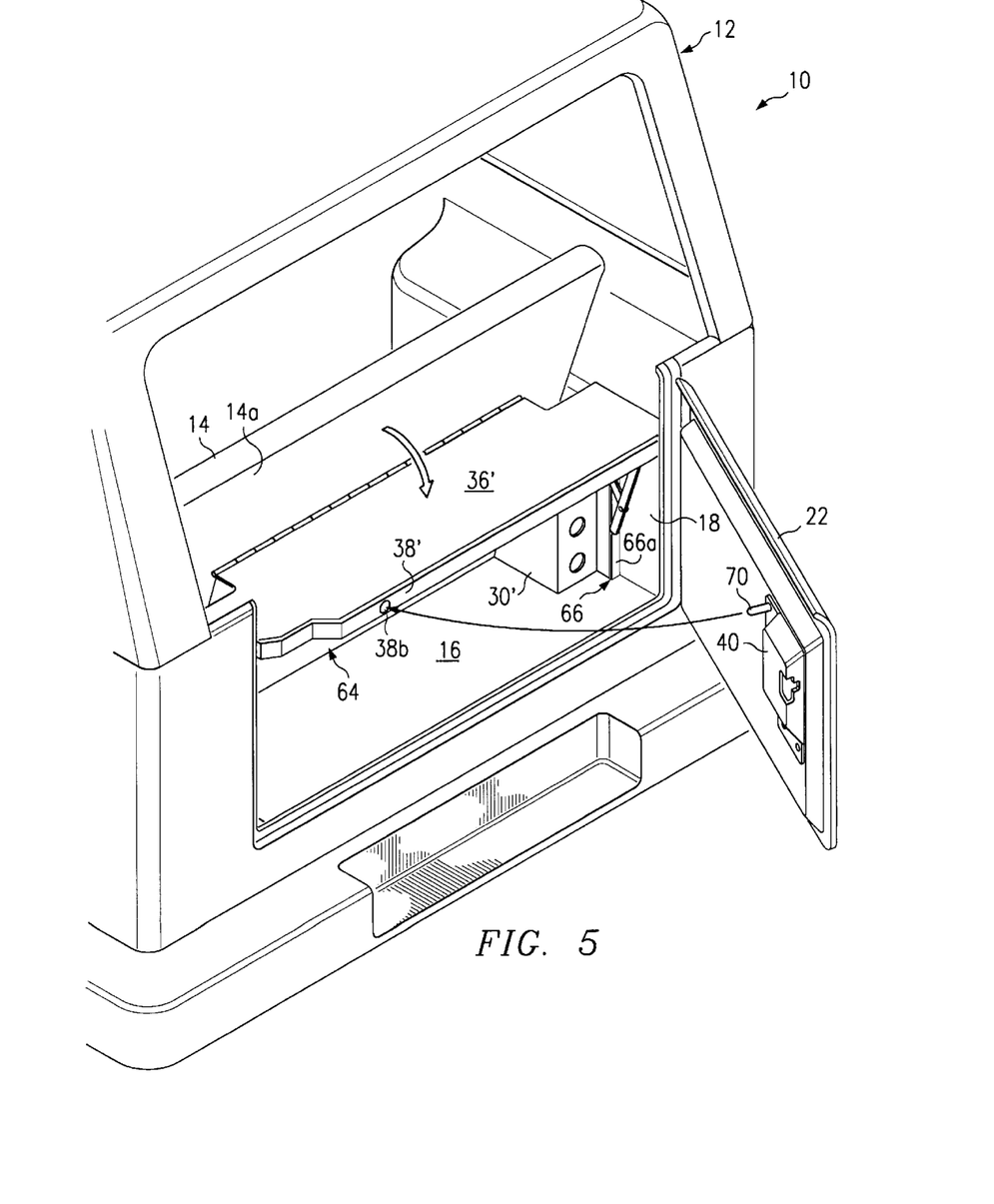
FIG. 5 is a perspective view of the security enclosure of FIG. 4 in a closed configuration.

FIGS. 4 and 5 depict details of a security enclosure 64 according to a second embodiment of the present invention. Since the security enclosure 64 contains many components that are identical to those of the first embodiment, these components are referred to by similar reference numerals and will not be described in any further detail.

In accordance with the embodiment of FIGS. 4 and 5, the flange portions 30' and 32' are not secured to the deck sidewalls 18 and 20. Instead, two U-shaped channels 66 and 68 are secured to the deck sidewalls 18 and 20, respectively, where the flange portions 30' and 32' were secured in the first embodiment. The U-shaped channels 66 and 68 include channel flange portions 66a and 68a, respectively, which extend outwardly from the deck sidewalls 18 and 20. The flange portions 30' and 32' are sized to matingly slide into and out of the channel flange portions 66a and 68a, respectively.

Further to the embodiment of FIGS. 4 and 5, the tailgate latch housing 40 is provided with a pin 70 which extends perpendicularly from the tailgate 22. A bore 38b is formed in the rear edge reinforcing lip 38' of the top panel 36' for receiving the pin 70 when the security enclosure 64 is installed and the tailgate 22 is closed.

In operation, the security enclosure 64 may be readily installed into the rear portion 10 of the vehicle 12 by sliding the flanges portions, 30 and 32' into the channel flange portions 66a and 68a, respectively, as shown in FIG. 4. Similarly, the security enclosure 64 may be readily removed from the rear portion 10 of the vehicle 12 by sliding the forward panel flanges 30' and 32' out of the channel flange portions 66a and 68a, respectively. It should be noted that the rear seat 14 may be moved or rotated forward prior to facilitate installation or removal of the security enclosure 64.

As shown in FIG. 5, after the enclosure 64 is installed and the top panel 36' is closed, the enclosure 64 and top panel 36' may be secured in place by closing the tailgate 22 so that the pin 70 penetrates the bore 38b, thereby securing any valuables stored within the enclosure.

Access to the interior of the enclosure 64 may then only be gained by opening the tailgate 22. After the tailgate 22 is opened, the top panel 36' may also be rotated open for greater access, and/or for the storage (albeit not secured) of items too large to fit completely within the security enclosure 64.

The second embodiment of the present invention has several advantages in addition to those described above with respect to the first embodiment. For example, if the security enclosure 64 is not needed, or if flat open space is needed on the load deck 16 for storing items too large to fit within the enclosure 64, then the enclosure may be easily removed. In addition, the complexity of the lock mechanisms 46 and 48 are replaced by the pin 70.

Figure 6:
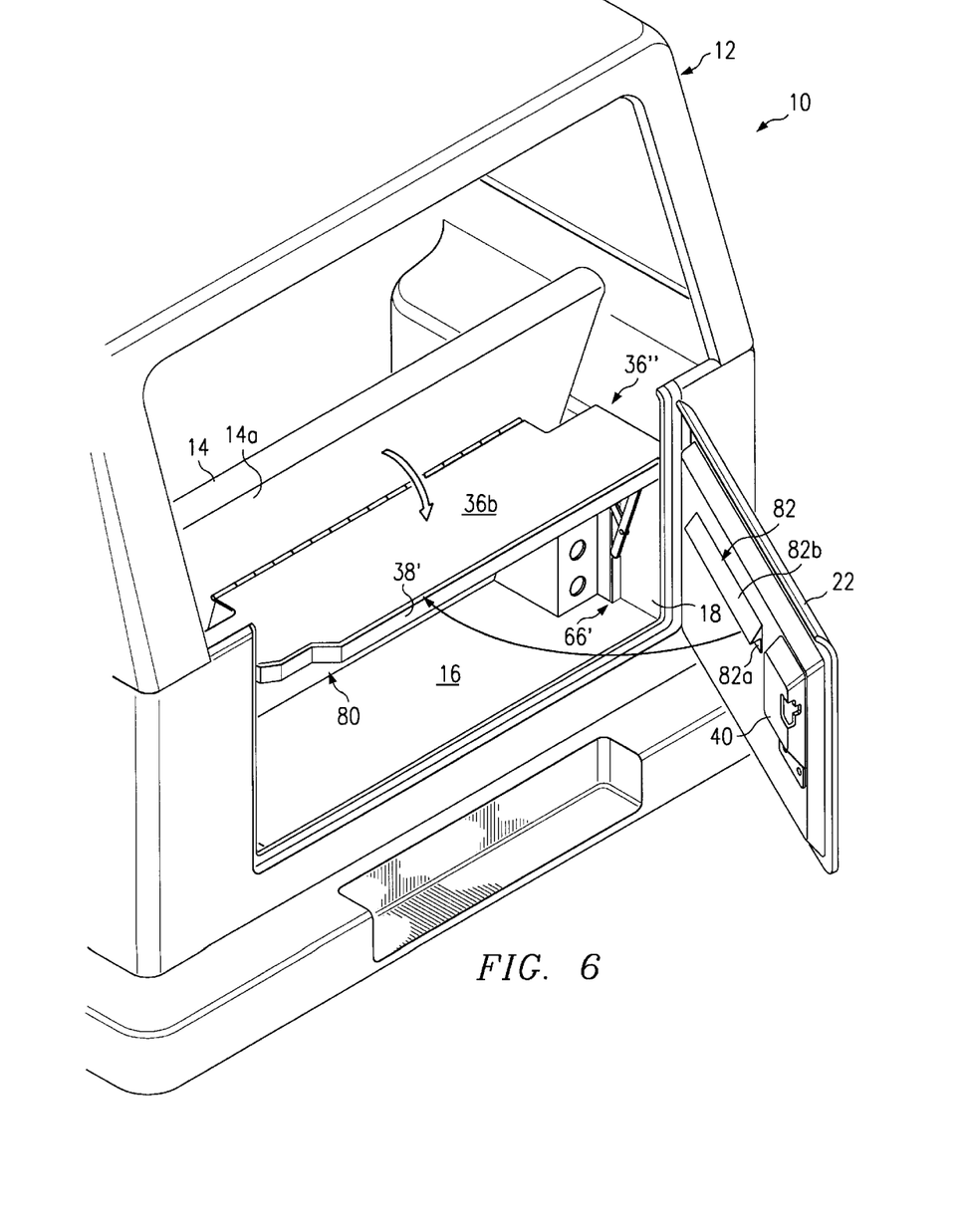
FIG. 6 is a perspective view of the security enclosure, according to a third embodiment of the present invention, mounted in a closed configuration on the load deck of a jeep vehicle.

FIG. 6 depicts details of a security enclosure 80 according to a third embodiment of the present invention. The security enclosure 80 contains many components that are identical to those of the second embodiment and, for this reason, these components are referred to by similar reference numerals and will not be described in any further detail.

In accordance with the embodiment of FIG. 6, the tailgate 22 is provided with a locking bar 82 which is attached to and extends horizontally across the tailgate. The locking bar 82 includes a flat horizontal portion 82a which extends away from the tailgate 22 and is generally flush with the top surface 36b of the top panel 36" when the top panel is in a lowered, or closed, position as shown in FIG. 6. The locking bar 82 also includes a flat angular portion 82b which extends from the outer edge of the horizontal portion 82a upwardly to the tailgate 22. In contrast to the foregoing second embodiment depicted in FIGS. 4 and 5, a bore is not formed in the rear edge reinforcing lip 38' of the top panel 36".

In operation, the security enclosure 80 may be readily installed into and removed from the rear portion 10 of the vehicle 12 via U-shaped channels 66' in a manner similar to that described with respect to the foregoing second embodiment depicted in FIGS. 4 and 5.

As shown in FIG. 6, after the enclosure 80 is installed and the top panel 36" is closed, the enclosure 80 and top panel 36" may be secured in place by closing the tailgate 22 so that the flat horizontal portion 82a of the locking bar 82 lies generally flush with the top surface 36b of the top panel 36", thereby securing any valuables stored within the enclosure.

Access to the interior of the enclosure 80 may then only be gained by opening the tailgate 22. After the tailgate 22 is opened, the top panel 36" may also be rotated open for greater access, and/or for the storage (albeit not secured) of items too large to fit completely within the security enclosure 80.

The third embodiment of the present invention has several advantages in addition to those described above with respect to the first and second embodiments. For example, the position on the tailgate 22 and the shape of the locking bar 82 render the locking bar less likely than the pin 70 to catch and tear a person's garments, or to injure a person. Because the protrusion of the locking bar 82 is less conspicuous than that of the pin 70, and because the locking bar has greater surface of contact with the tailgate 22, the locking bar has greater structural integrity than that of the pin. Additionally, if the top panel 36" is closed while the tailgate is partially open, the top panel 36" will engage the angular surface 82b of the locking bar 82 and deflect the bar causing the tailgate to open out of the way, rather than break as the pin 70 is susceptible to do. The locking bar 82 is also simpler to align with the top panel 36" than the pin 70 is to align with the hole 38b.

It is understood that several variations may be made in the foregoing without departing from the scope of the invention. For example, in the first embodiment, the top panel 36 may be secured in the closed position in a manner similar to that described with respect to the second embodiment wherein a pin extends from the tailgate latch housing 40 for penetration into a bore formed in the rear edge reinforcing lip 38 of the top panel 36. The pin may be accompanied by additional such pins and additional bores similar to the bore appropriately formed and located for receiving the additional pins to thereby further secure the top panel 36 in a closed position. The pin may also be configured so that it folds out of the way when not being used. The enclosure 64 or 80 of the second and third embodiments, respectively, may be provided with lock mechanisms and as with the first embodiment for enhancing the security of valuables stored therein. In addition, the invention may be simplified by configuring the top panel 36 without the tip portion 42b, and/or by rigidly attaching the top panel 36 to the forward panel 26 and, hence, foregoing the mobility provided by the hinge 37.

Although illustrative embodiments of the invention have been shown and described, a wide range of modification, change, and substitution is contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. In a vehicle having a load deck, deck sidewalls, and a tailgate, a security enclosure for installation within the load deck thereof, the security enclosure comprising:

a first panel extending between the deck sidewalls and sloping upwardly toward the tailgate from a first end adjacent the load deck to a distal second end, a second panel coupled to the second end of the first panel and extending therefrom toward the tailgate; and means for securing the second panel in a position relative to the first panel so that an enclosed space is defined by the first and second panels, the tailgate, the load deck, and the deck sidewalls, wherein the securing means comprises a releasable lock mechanism attached to the second panel, which lock mechanism includes a bolt extendable through a bore formed through the first panel.

2. The security enclosure of claim 1 wherein the first panel is mounted directly to the deck sidewalls.

3. The security enclosure of claim 1 wherein the second panel includes opposing edges configured for engaging the bolt when the bolt is extended through the bore of the first panel to thereby further secure the second panel to the first panel.

4. In a vehicle having a load deck, deck sidewalls, and a tailgate, a security enclosure for installation within the load deck thereof, the security enclosure comprising:

a first panel extending between the deck sidewalls and sloping upwardly toward the tailgate from a first end adjacent the load deck to a distal second end, a second panel coupled to the second end of the first panel and extending therefrom toward the tailgate; and means for securing the second panel in a position relative to the first panel so that an enclosed space is defined by the first and second panels, the tailgate, the load deck, and the deck sidewalls, wherein the deck sidewalls include wheel wells for supporting the second panel in a generally horizontal position.

5. In a vehicle having a load deck, deck sidewalls, and a tailgate, a security enclosure for installation within the load deck thereof, the security enclosure comprising:

a first panel extending between the deck sidewalls and sloping upwardly toward the tailgate from a first end adjacent the load deck to a distal second end;

a second panel coupled to the second end of the first panel and extending therefrom toward the tailgate; and means for securing the second panel in a position relative to the first panel so that an enclosed space is defined by the first and second panels, the tailgate, the load deck, and the deck sidewalls, wherein the first panel is disposed at an angle permitting the first panel to be generally flush with a seat.

6. In a vehicle having a load deck, deck sidewalls, and a tailgate, a security enclosure for installation within the load deck thereof, the security enclosure comprising:

a first panel extending between the deck sidewalls and extending upwardly from a first end adjacent the load deck to a distal second end, the first panel having a bore formed therethrough;

a second panel coupled to the second end of the first panel and extending therefrom toward the tailgate; and a releasable lock mechanism attached to the second panel which includes a bolt extendable through the bore formed through the first panel for securing the second panel in a position relative to the first panel so that an enclosed space is defined by the first and second panels, the tailgate, the load deck, and the deck sidewalls.

7. The security enclosure of claim 6 wherein the second panel includes opposing edges configured for engaging the bolt when the bolt is extended through the bore of the first panel to thereby further secure the second panel to the first panel.

8. The security enclosure of claim 6 further comprising means connectable to the deck sidewalls for removably and slidably receiving the first panel.

9. The security enclosure of claim 8 wherein the receiving means are U-shaped channels mounted to the deck sidewalls.

10. The security enclosure of claim 8 further comprising means connectable to the tailgate for preventing the slidable removal of the first panel.

11. The security enclosure of claim 10 wherein the preventing means comprises a pin extending from the tailgate and wherein the second panel defines a bore for receiving the pin.

12. The security enclosure of claim 10 wherein the preventing means comprises a locking bar positioned on the tailgate for lying generally flush with and securing the second panel in the position relative to the first panel so that the enclosed space is defined.

13. The security enclosure of claim 6 wherein the deck sidewalls include wheel wells for supporting the second panel.

14. The security enclosure of claim 3 wherein the wheel wells support the second panel in a generally horizontal position.

15. The security enclosure of claim 6 wherein the fist panel is disposed at an angle sloping upwardly from the load deck toward the tailgate permitting the first panel to be generally flush with a eat.

16. In a vehicle having a load deck, deck sidewalls having respective wheel wells, and a tailgate, a security enclosure for installation within the load deck thereof, the security enclosure comprising:

a first panel extending between the deck sidewalls and extending upwardly from a first end adjacent the load deck to a distal second end;

a second panel coupled to the second end of the first panel and extending therefrom toward the tailgate, the second panel ha opposing sloped edges for engaging the wheel wells to support the second panel in a generally horizontal position; and means for securing the second panel in the generally horizontal position so that an enclosed space is defined by the first and second panels, the tailgate, the load deck, and the deck sidewalls.

17. The security enclosure of claim 16 further comprising means connectable to the deck sidewalls for removably and slidably receiving the first panel.

18. The security enclosure of claim 17 wherein the receiving means are U-shaped channels mounted to the deck sidewalls.

19. The security enclosure of claim 17 further comprising means connectable to the tailgate for preventing the slidable removal of the first panel.

20. The security enclosure of claim 19 wherein the preventing means comprises a pin extending from the tailgate and wherein the second panel defines a bore for receiving the pin.

21. The security enclosure of claim 19 wherein the preventing means comprises a locking bar positioned on the tailgate for lying generally flush with and securing the second panel in the generally horizontal position relative to the first panel so that the enclosed space is defined.

22. The security enclosure of claim 11 wherein the securing means comprises a releasable lock mechanism attached to the second panel, which lock mechanism includes a bolt extendable through a bore forced through the first panel.

23. The security enclosure of claim 22 wherein the second panel opposing edges engage the bolt when the bolt is extended through the bore of the first panel to thereby further secure the second panel to the first panel.

24. The security enclosure of claim 16 wherein the securing means comprises a pin inwardly extending from the tailgate for extension through a bore formed in the second panel.

25. The security enclosure of claim 16 wherein the first panel is disposed at an angle permitting the first panel to be generally flush with a seat.

\* \* \* \* \*